Jan. 27, 1970    E. H. EASTIN    3,491,653
FLUID ACTUATORS WITH FLOW CONTROL
Filed Aug. 9, 1967    15 Sheets-Sheet 4
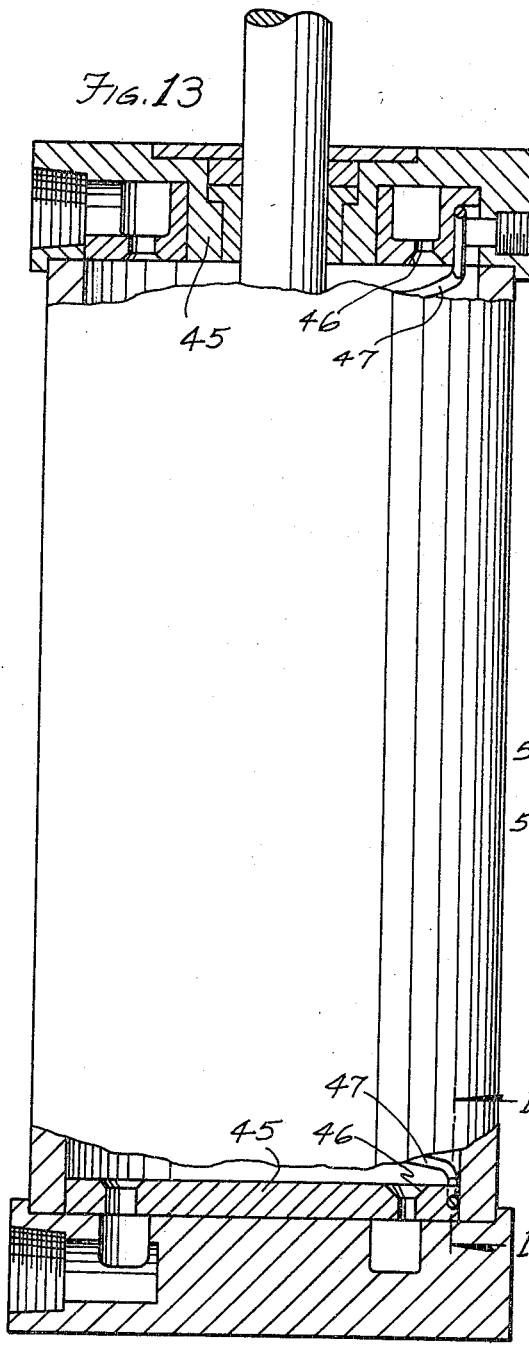
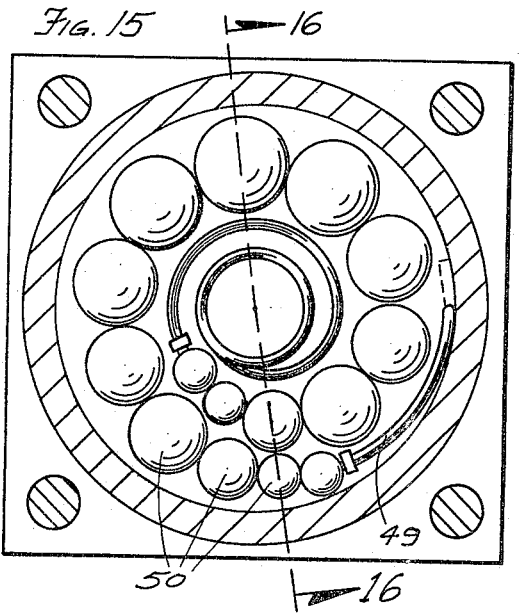
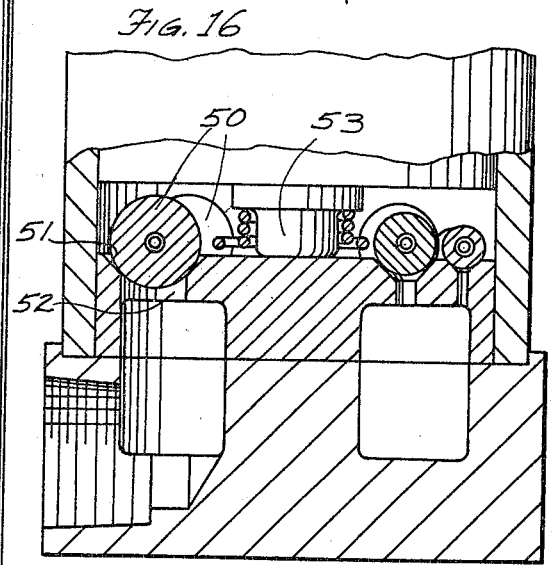
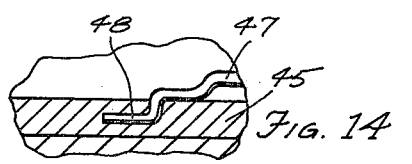
INVENTOR.
EDWARD H. EASTIN
BY
Barnes, Kisselle, Raisch & Choate
ATTORNEYS Jan. 27, 1970           E. H. EASTIN           3,491,653

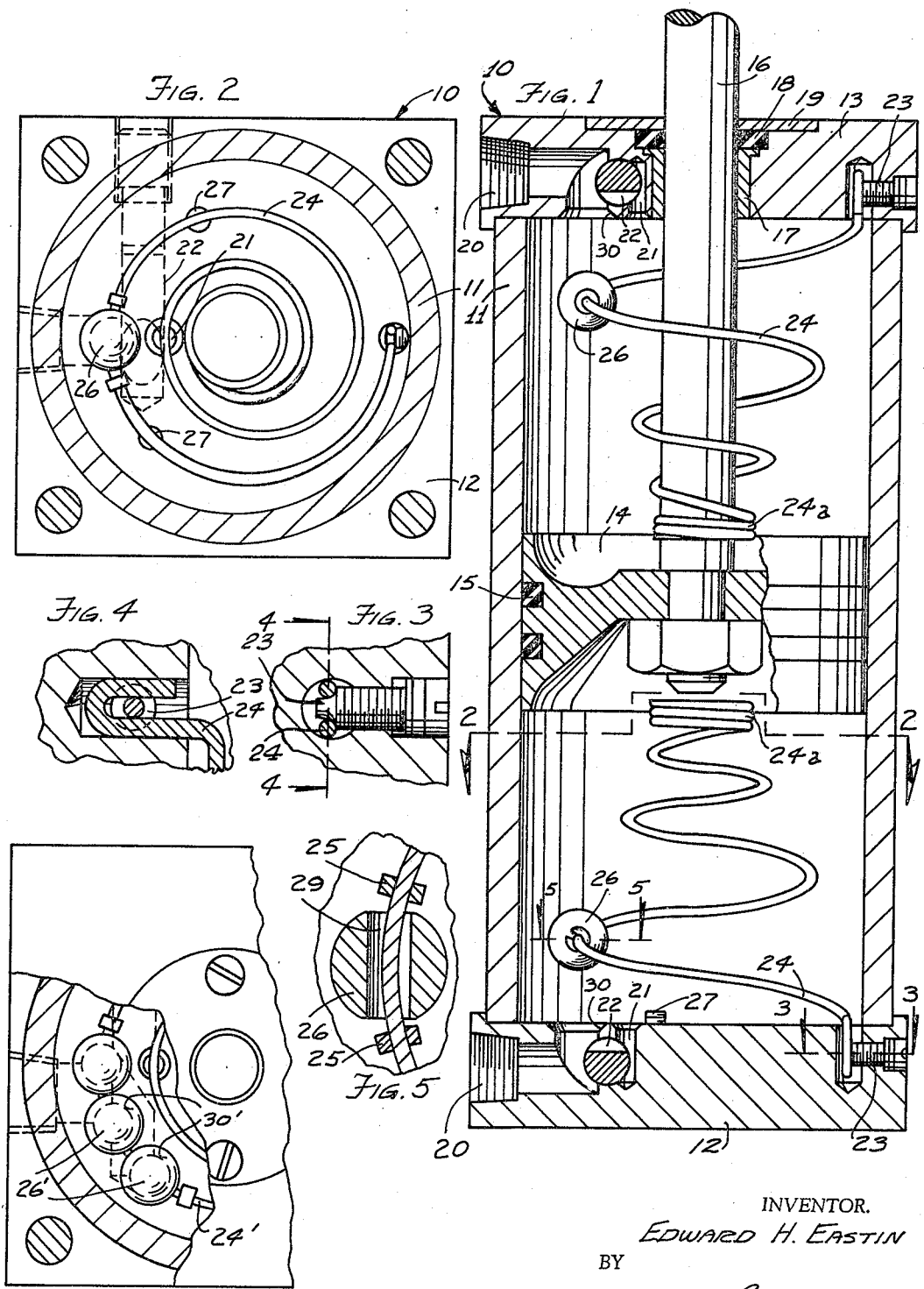

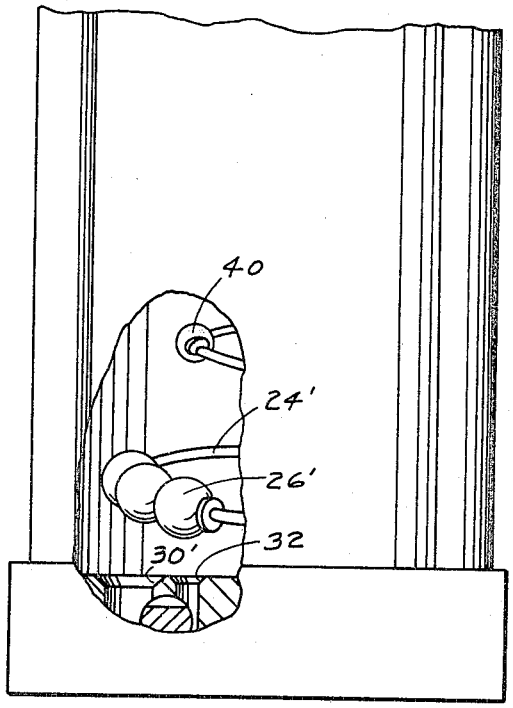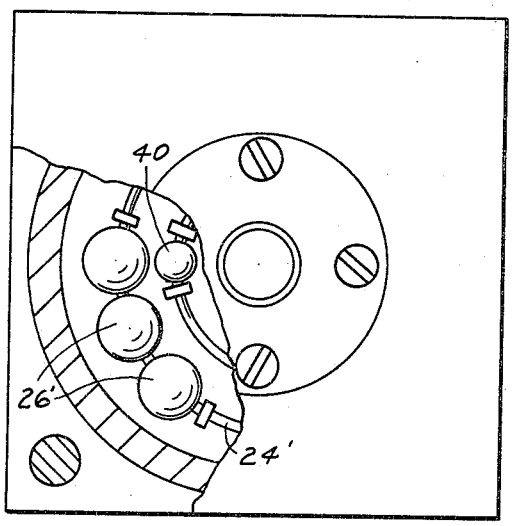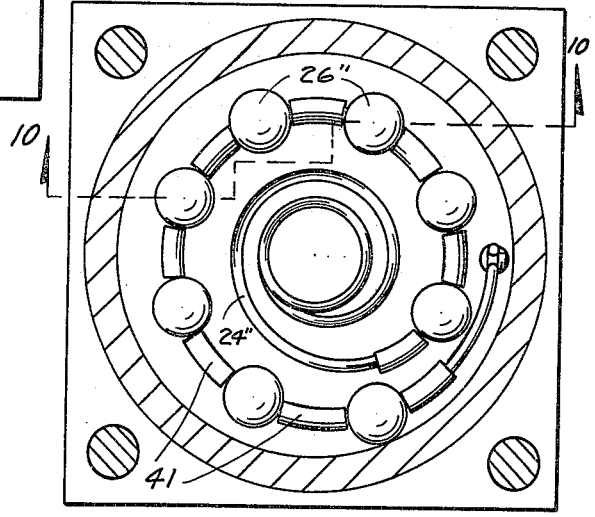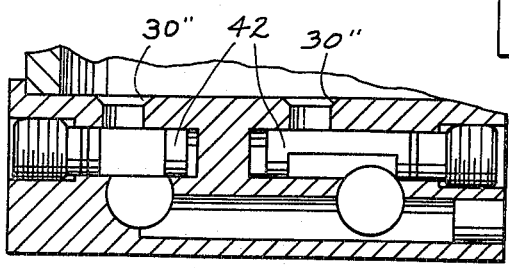

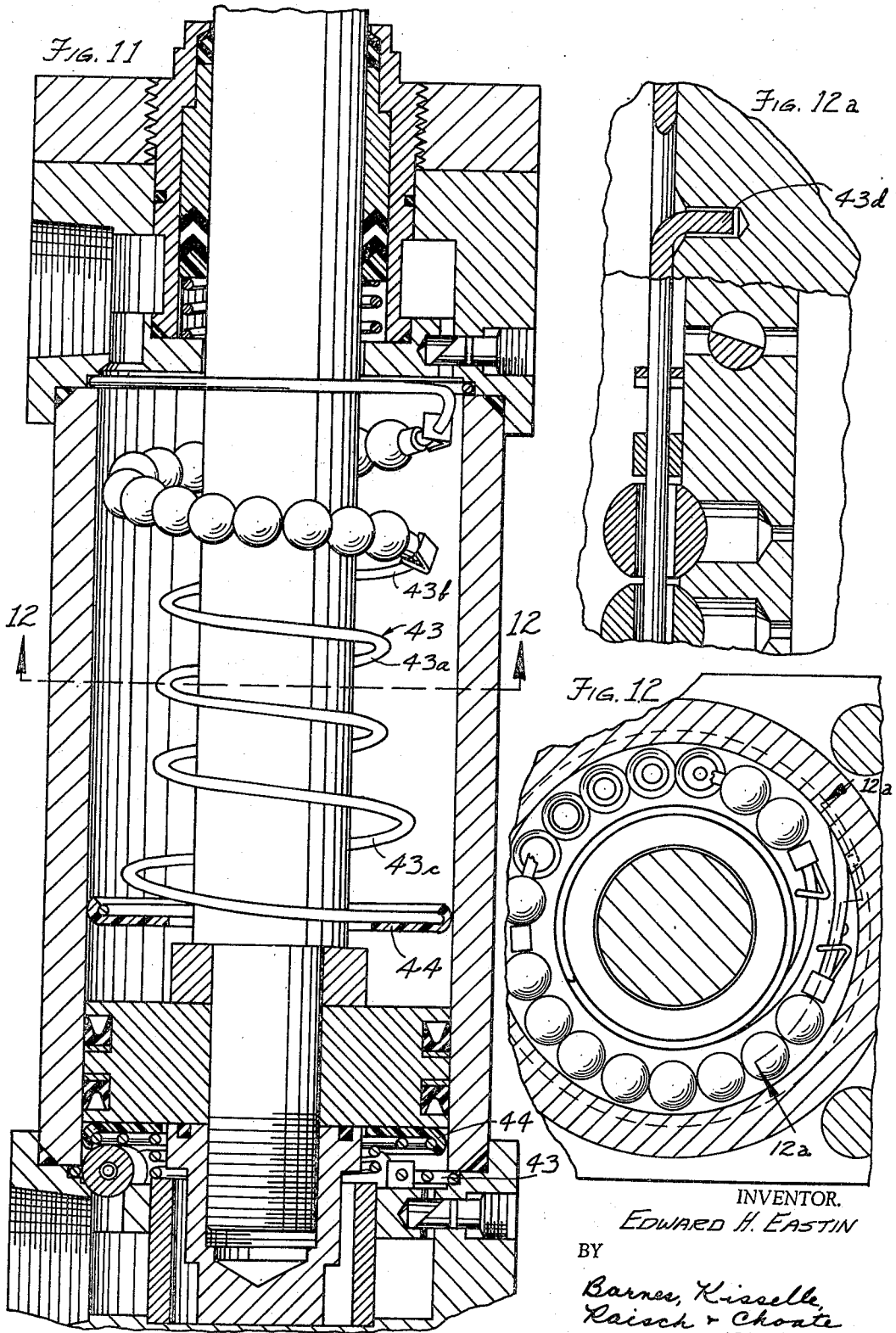

FLUID ACTUATORS WITH FLOW CONTROL

Filed Aug. 9, 1967           15 Sheets-Sheet 5

INVENTOR.
EDWARD H. EASTIN
BY
Barnes, Kisselle, Raisch & Choate
ATTORNEYS

Jan. 27, 1970  E. H. EASTIN  3,491,653
FLUID ACTUATORS WITH FLOW CONTROL
Filed Aug. 9, 1967  15 Sheets-Sheet 6

INVENTOR.
EDWARD H. EASTIN
BY
Barnes, Kisselle, Raisch & Choate
ATTORNEYS

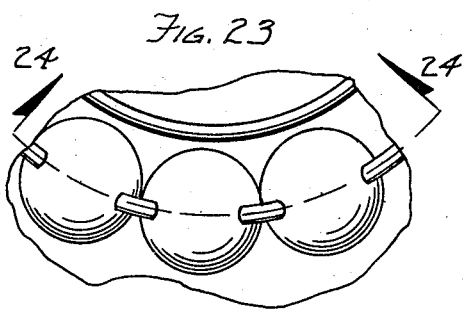
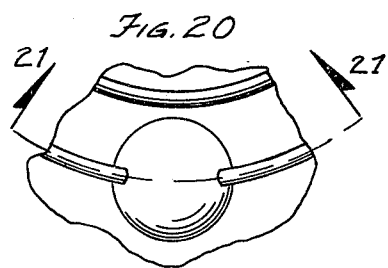
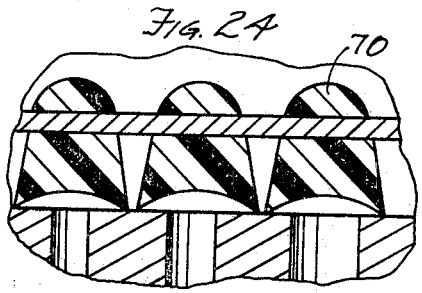
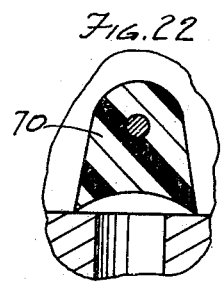
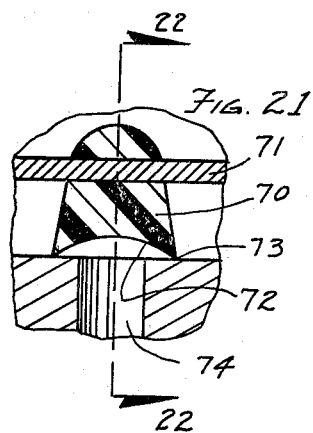
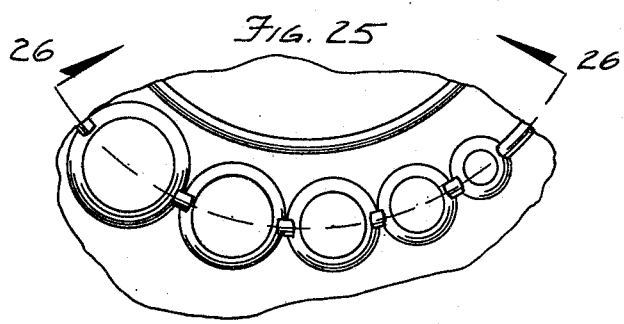
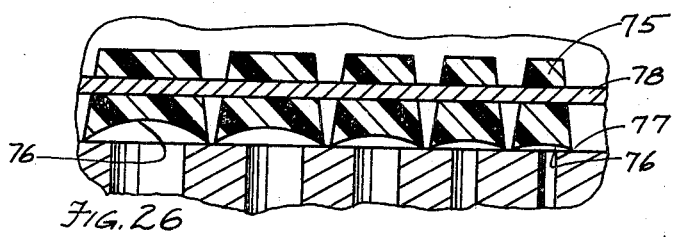

Jan. 27, 1970  E. H. EASTIN  3,491,653
FLUID ACTUATORS WITH FLOW CONTROL
Filed Aug. 9, 1967  15 Sheets-Sheet 8

INVENTOR.
EDWARD H. EASTIN
BY Barnes, Kisselle,
Raisch & Choate
ATTORNEYS

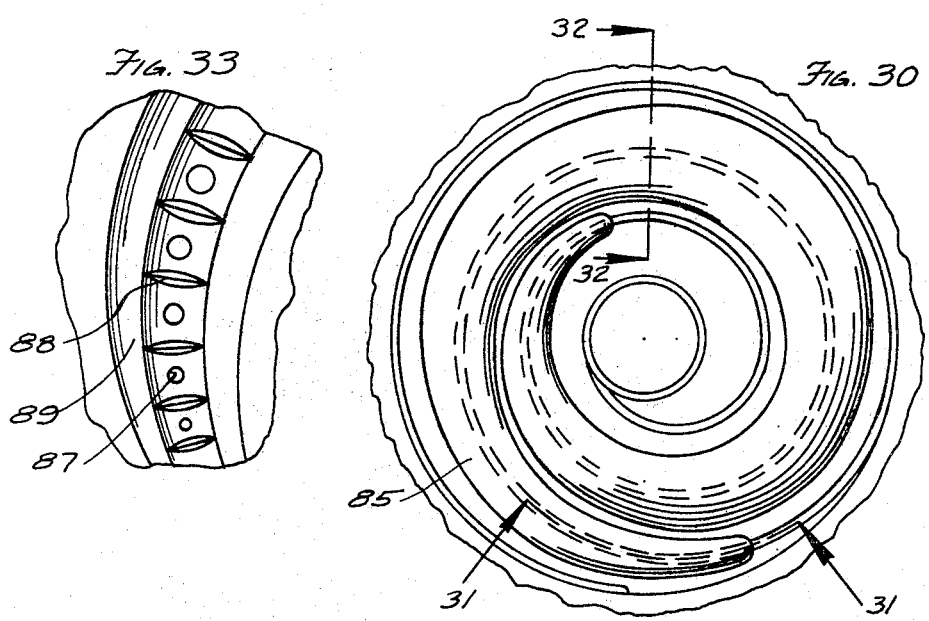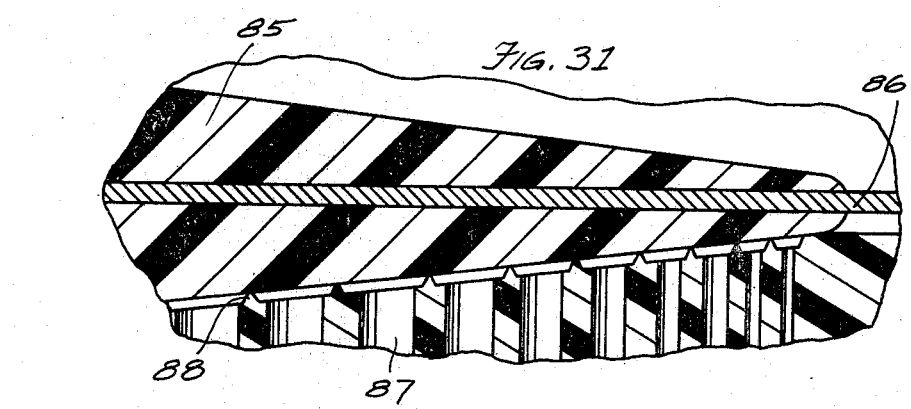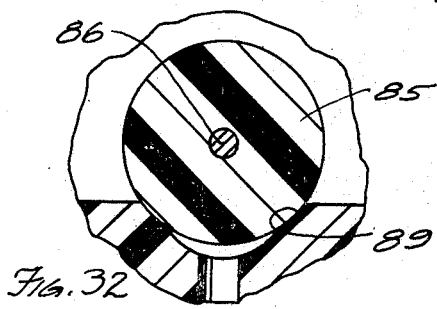

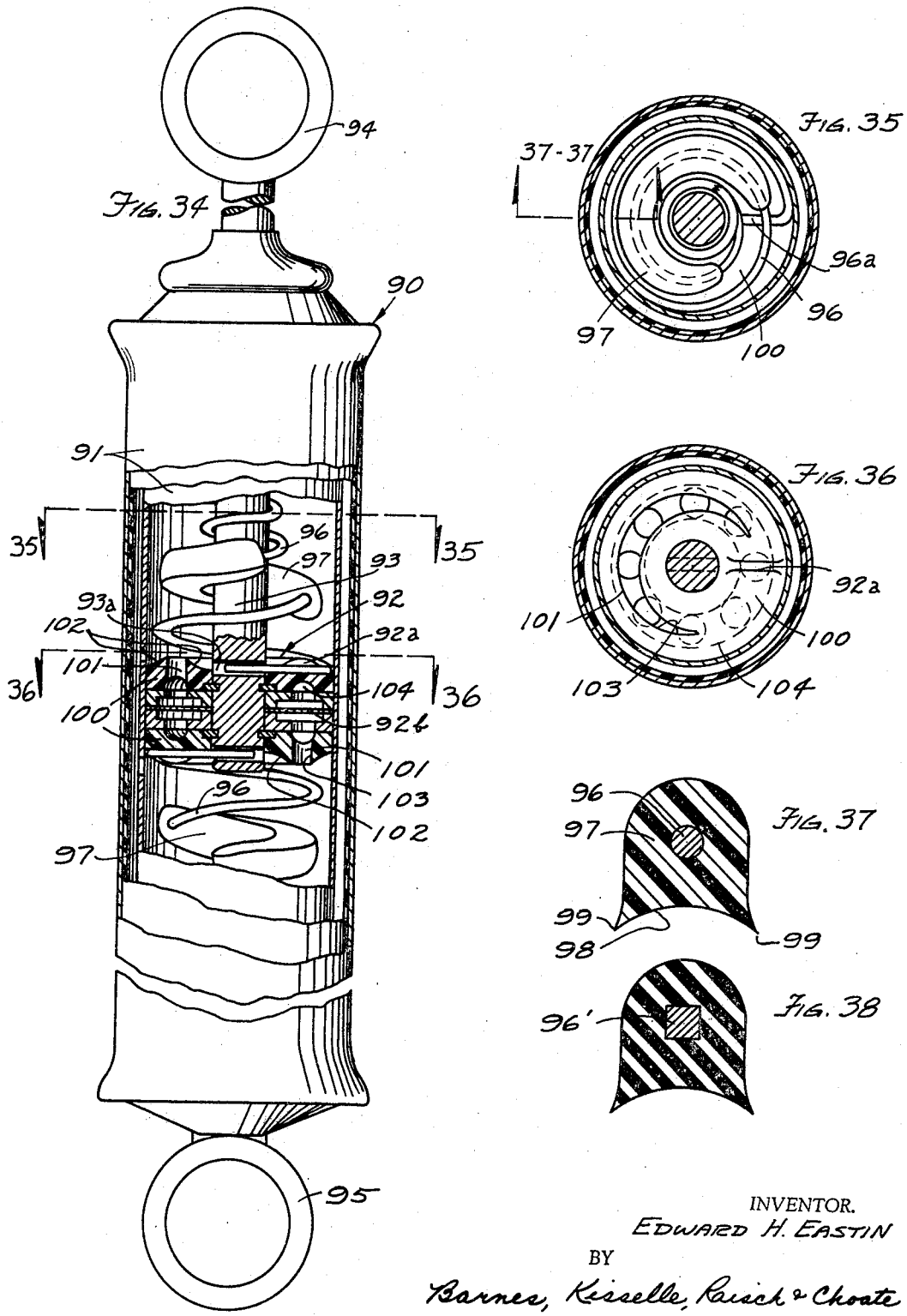

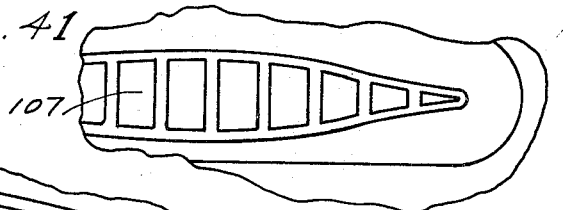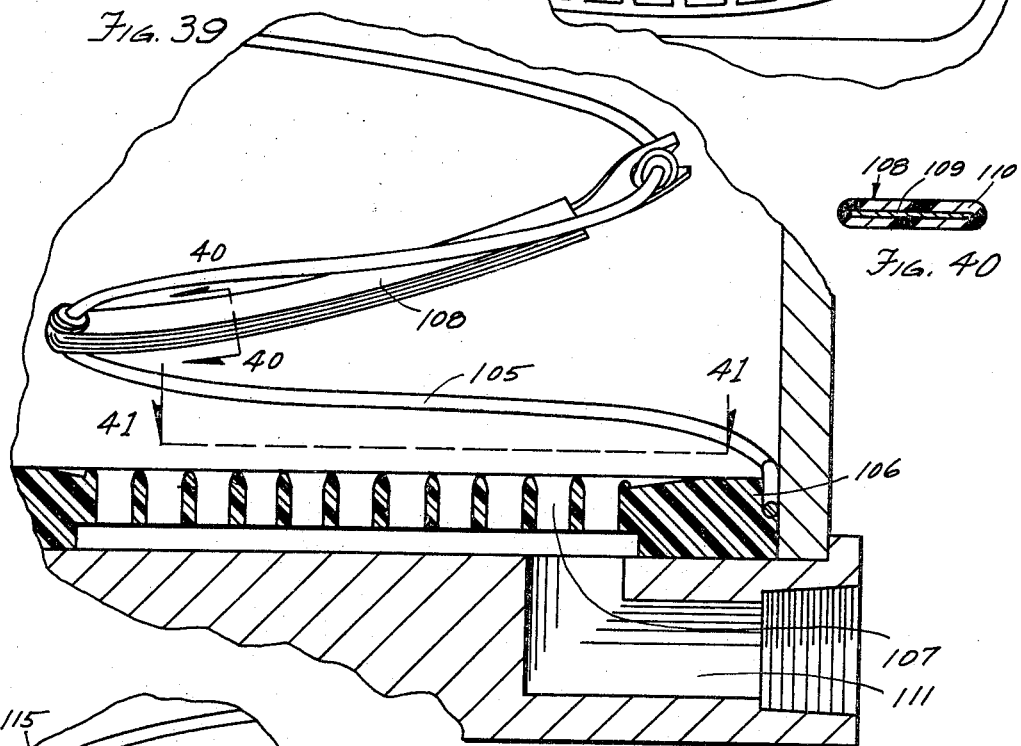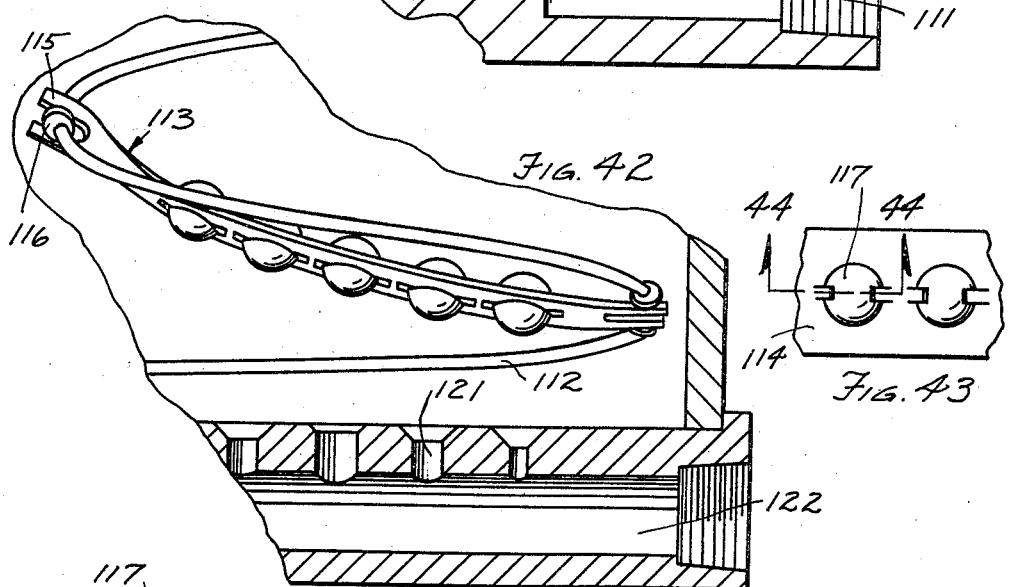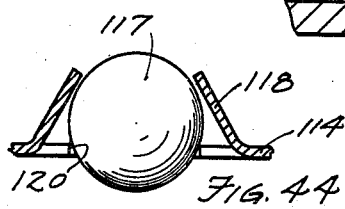

Jan. 27, 1970        E. H. EASTIN        3,491,653

FLUID ACTUATORS WITH FLOW CONTROL

Filed Aug. 9, 1967        15 Sheets-Sheet 12

INVENTOR.
EDWARD H. EASTIN

BY Barnes, Kisselle, Raisch & Choate

ATTORNEYS

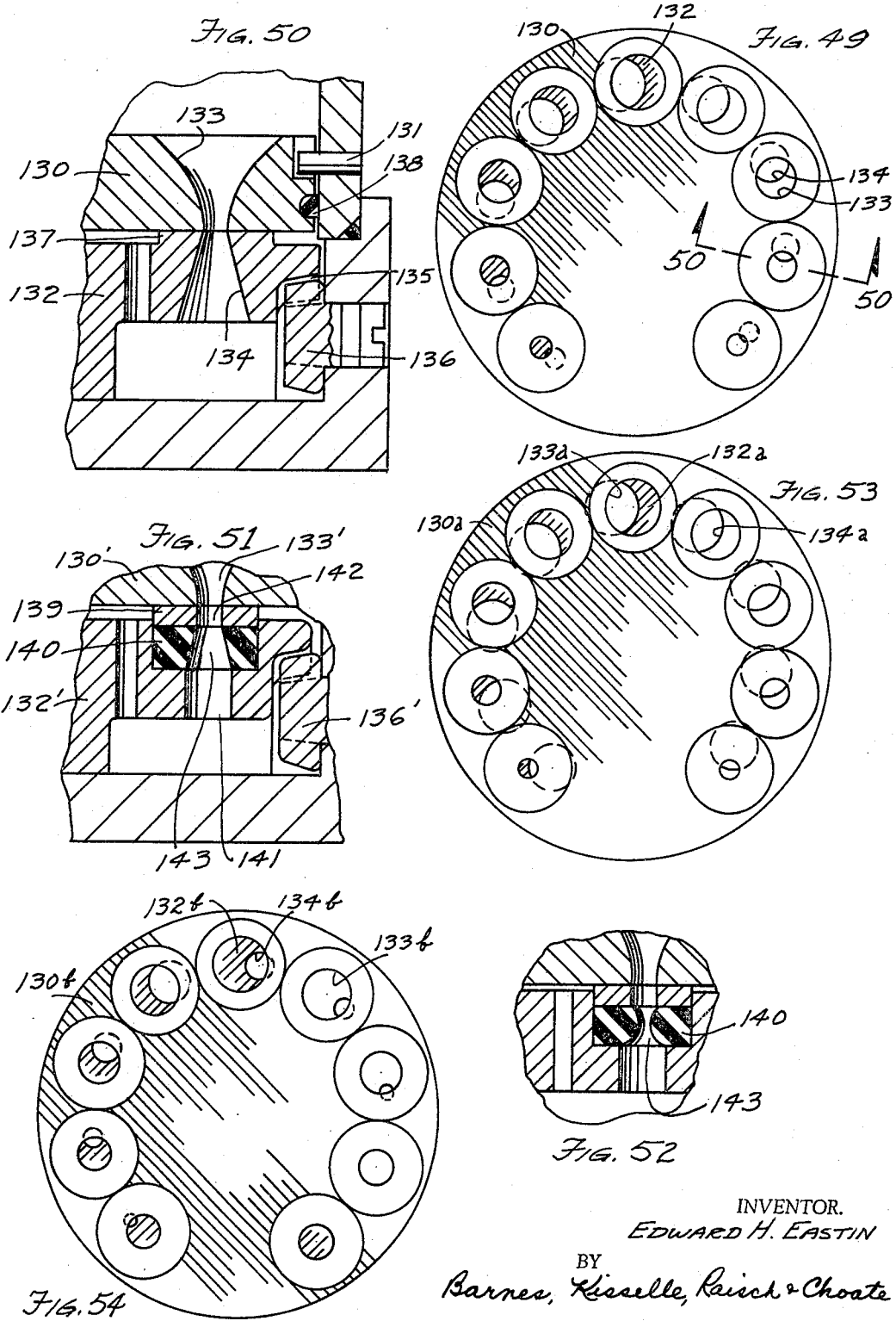

Jan. 27, 1970  E. H. EASTIN  3,491,653
FLUID ACTUATORS WITH FLOW CONTROL
Filed Aug. 9, 1967  15 Sheets-Sheet 14
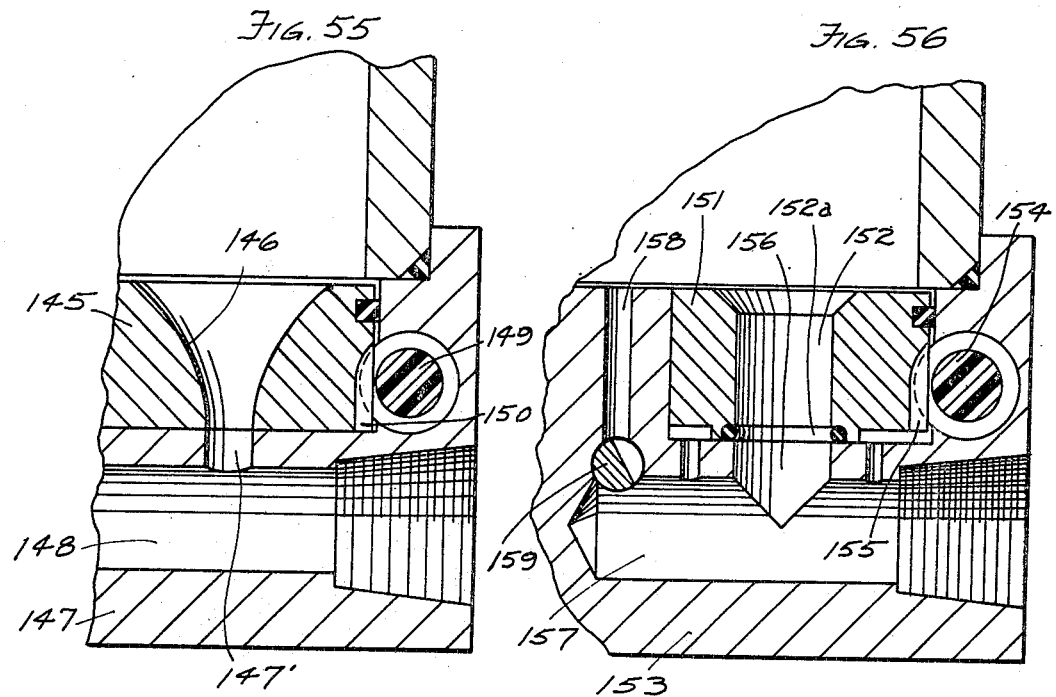
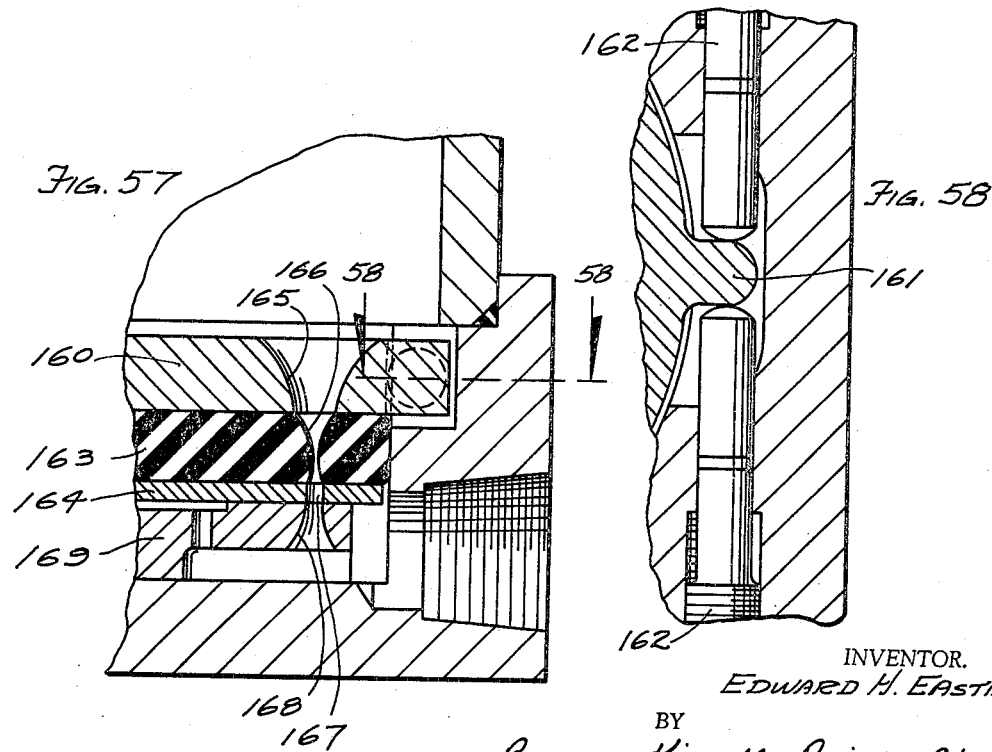
INVENTOR.
EDWARD H. EASTIN
BY
Barnes, Kisselle, Raisch & Choate
ATTORNEYS Jan. 27, 1970　　　　　E. H. EASTIN　　　　　3,491,653
FLUID ACTUATORS WITH FLOW CONTROL
Filed Aug. 9, 1967　　　　　　　　　　　　　15 Sheets-Sheet 15
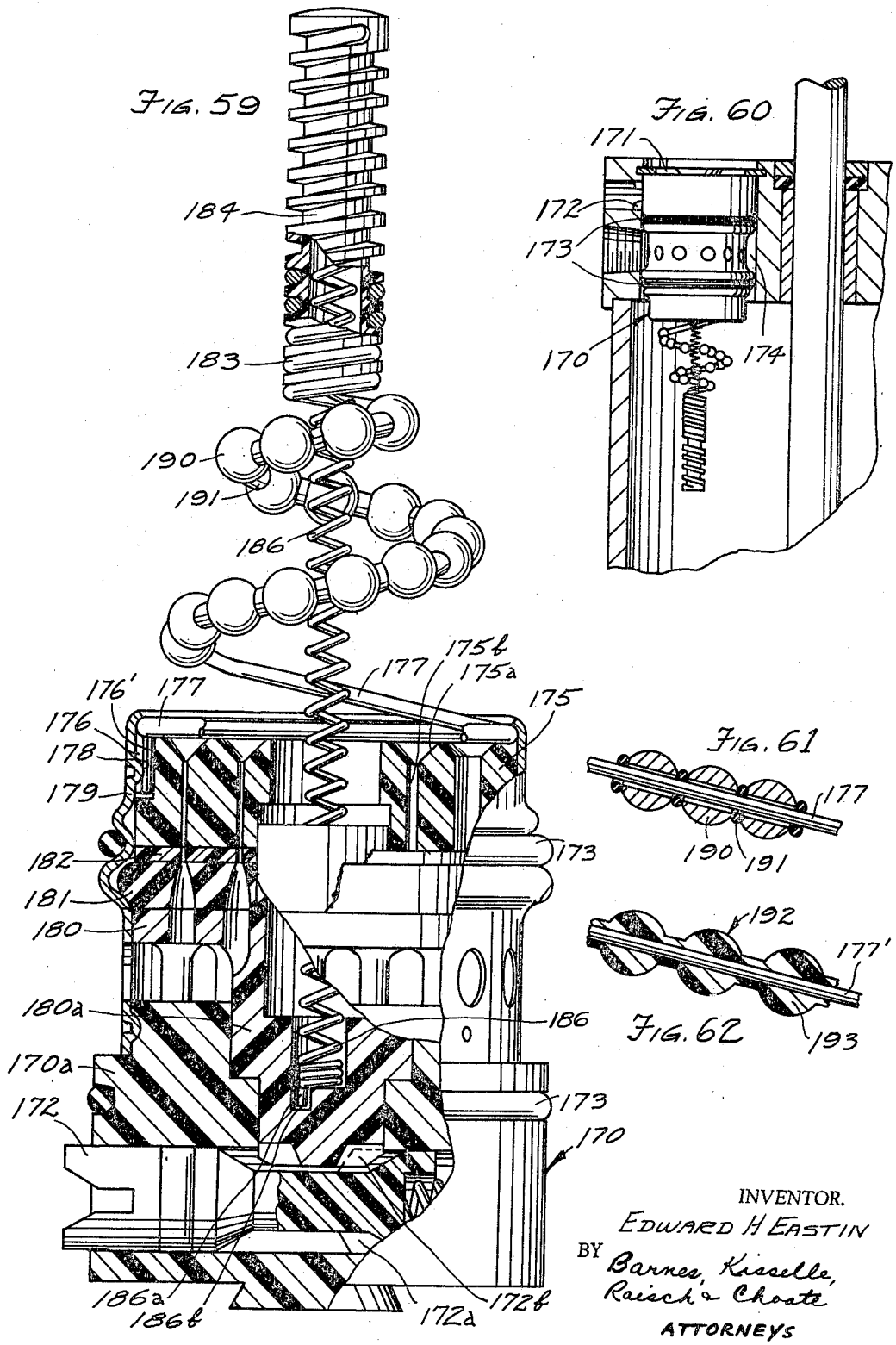
INVENTOR.
EDWARD H EASTIN
BY Barnes, Kisselle,
Raisch & Choate
ATTORNEYS United States Patent Office 3,491,653
Patented Jan. 27, 1970

3,491,653
FLUID ACTUATORS WITH FLOW CONTROL
Edward H. Eastin, 254 Reitman Court,
Rochester, Mich. 48063
Filed Aug. 9, 1967, Ser. No. 659,364
Int. Cl. F15b 15/22, 11/08, 13/04
U.S. Cl. 91—395                                21 Claims

ABSTRACT OF THE DISCLOSURE

The fluid actuators disclosed herein comprise both linear and rotary actuators. The actuators include a cylinder and a piston. The cylinder or piston have at least one opening therein for controlling the flow of fluid. A carrier is fixed to one of the cylinder and piston and supports a closure member which is operable upon relative movement between the piston and cylinder to move the closure member against the opening. In one form, the carrier is fixed to the cylinder. In another form, the carrier is fixed to the piston. In one form, the openings are provided in the cylinder, while in another form, the openings are provided in the piston. The carrier and closure members are of various designs and configurations as more specifically set forth in the specification. The fluid actuators are more specifically shown as being of the type utilized in cylinders, and shock absorbers.

This invention relates to fluid actuators and particularly to fluid actuators embodying means for controlling the rate of fluid flow in connection therewith and thereby controlling the rate of movement and operation of the actuator.

BACKGROUND OF THE INVENTION

Various designs have hereto been suggested and utilized for controlling the rate of movement of a piston in a cylinder and for cushioning the movement of the piston.

Among the objects of the invention are to provide a fluid actuator which includes controlled movement of the piston at a constant rate, or variable rate, at a decreasing rate, which movement can be controlled at various positions of the piston in the cylinder, which can be achieved with minimum overall length of the cylinder, wherein controlled velocity and de-acceleration motions can be achieved, wherein de-acceleration can be achieved at one or both ends of a cylinder, which fluid actuator can be manufactured at low cost, and which is dependable and requires minimum maintenance.

Among the further objects of the invention are to provide fluid actuators which are specifically designed for use as cylinders, shock absorbers, load arresters, door closers, welding guns and the like.

SUMMARY

The fluid actuators disclosed herein comprise both linear and rotary actuators. The actuators include a cylinder and a piston. The cylinder or piston have at least one opening therein for controlling the flow of fluid. A carrier is fixed to one of the cylinder and piston and supports a closure member which is operable upon relative movement between the piston and cylinder to move the closure member against the opening. In one form, the carrier is fixed to the cylinder. In another form, the carrier is fixed to the piston. In one form, the openings are provided in the cylinder, while in another form, the openings are provided in the piston. The carrier and closure members are of various designs and configurations as more specifically set forth in the specification. The fluid actuators are more specifically shown as being of the type utilized in cylinders and shock absorbers.

DESCRIPTION OF THE DRAWINGS

FIG. 1 is a longitudinal sectional view through a fluid actuator embodying the invention.

FIG. 2 is a sectional view taken along the line 2—2 in FIG. 1.

FIG. 3 is a fragmentary sectional view on an enlarged scale taken along the line 3—3 in FIG. 1.

FIG. 4 is a fragmentary sectional view taken along the line 4—4 in FIG. 3.

FIG. 5 is a fragmentary sectional view on an enlarged scale taken along the line 5—5 in FIG. 1.

FIG. 6 is a part sectional end view of a modified form of actuator.

FIG. 7 is a part sectional side view of a further modified form of actuator.

FIG. 8 is a part sectional end view of the actuator shown in FIG. 7.

FIG. 9 is a transverse sectional view of a further modified form of actuator.

FIG. 10 is a fragmentary sectional view taken along the line 10—10 in FIG. 9.

FIG. 11 is a fragmentary longitudinal sectional view of a further modified form of actuator.

FIG. 12 is a transverse sectional view taken along the line 12—12 in FIG. 11, parts being broken away.

FIG. 12a is a fragmentary sectional view taken along the line 12a—12a in FIG. 12.

FIG. 13 is a fragmentary longitudinal sectional view of a further modified form of actuator.

FIG. 14 is a fragmentary sectional view taken along the line 14—14 in FIG. 13.

FIG. 15 is a transverse sectional view of a further modified form of fluid actuator.

FIG. 16 is a fragmentary sectional view taken along the line 16—16 in FIG. 15.

FIG. 20 is a fragemntary plan view of a modified form of closure member.

FIG. 21 is a fragmentary sectional view taken along the line 21—21 in FIG. 20.

FIG. 22 is a fragmentary sectional view taken along the line 22—22 in FIG. 21.

FIG. 23 is a fragmentary plan view of a further modified form of closure member.

FIG. 24 is a fragmentary sectional view taken along the line 24—24 in FIG. 23.

FIG. 25 is a fragmentary plan view of a further modified form of closure member.

FIG. 26 is a fragmentary sectional view taken along the line 26—26 in FIG. 25.

FIG. 30 is a fragmentary plan view of a further modified form of closure member.

FIG. 31 is a fragmentary sectional view on an enlarged scale taken along the line 31—31 in FIG. 30.

FIG. 32 is a fragmentary sectional view on an enlarged scale taken along the line 32—32 in FIG. 30.

FIG. 33 is a fragmentary plan view of a portion of the fluid actuator shown in FIGS. 30–32.

FIG. 34 is a part sectional longitudinal view of a shock absorber embodying the invention.

FIG. 35 is a sectional view taken along the line 35—35 in FIG. 34.

FIG. 36 is a sectional view taken along the line 36—36 in FIG. 34.

FIG. 37 is an enlarged sectional view taken generally along the line 37—37 in FIG. 35.

FIG. 38 is a view similar to FIG. 37 showing a modified form.

FIG. 39 is a fragmentary longitudinally sectional view of a further modified form of actuator.

FIG. 40 is a sectional view taken along the line 40—40 in FIG. 39.

FIG. 41 is a fragmentary plan view taken along the line 41—41 in FIG. 39.

FIG. 42 is a fragmentary longitudinal sectional view through a further modified form of actuator.

FIG. 43 is a fragmentary plan view of a portion of the actuator shown in FIG. 42.

FIG. 44 is a fragmentary sectional view taken along the line 44—44 in FIG. 43.

FIG. 49 is a fragmentary plan view of a part of a modified form of actuator.

FIG. 50 is a fragmentary sectional view taken along the line 50—50 in FIG. 49.

FIG. 51 is a fragmentary sectional view of a further modified form of actuator similar to FIG. 50.

FIG. 52 is a fragmentary sectional view of the device shown in FIG. 51.

FIG. 53 is a plan view of a part of a further modified form of actuator.

FIG. 54 is a plan view of a portion of a further modified form of actuator.

FIG. 55 is a fragmentary longitudinal sectional view of a further modified form of actuator.

FIG. 56 is a fragmentary sectional view of a still further modified form of fluid actuator.

FIG. 57 is a fragmentary sectional view of a further modified form of actuator.

FIG. 58 is a fragmentary sectional view taken along the line 58—58 in FIG. 57.

FIG. 59 is a part sectional longitudinal view of an insert that may be utilized in a fluid actuator.

FIG. 60 is a longitudinal sectional view of a fluid actuator embodying the insert shown in FIG. 59.

FIG. 61 is a fragmentary sectional view of the insert shown in FIG. 59.

FIG. 62 is a fragmentary sectional view of another form of the insert shown in FIG. 59.

DESCRIPTION

Figure 17:
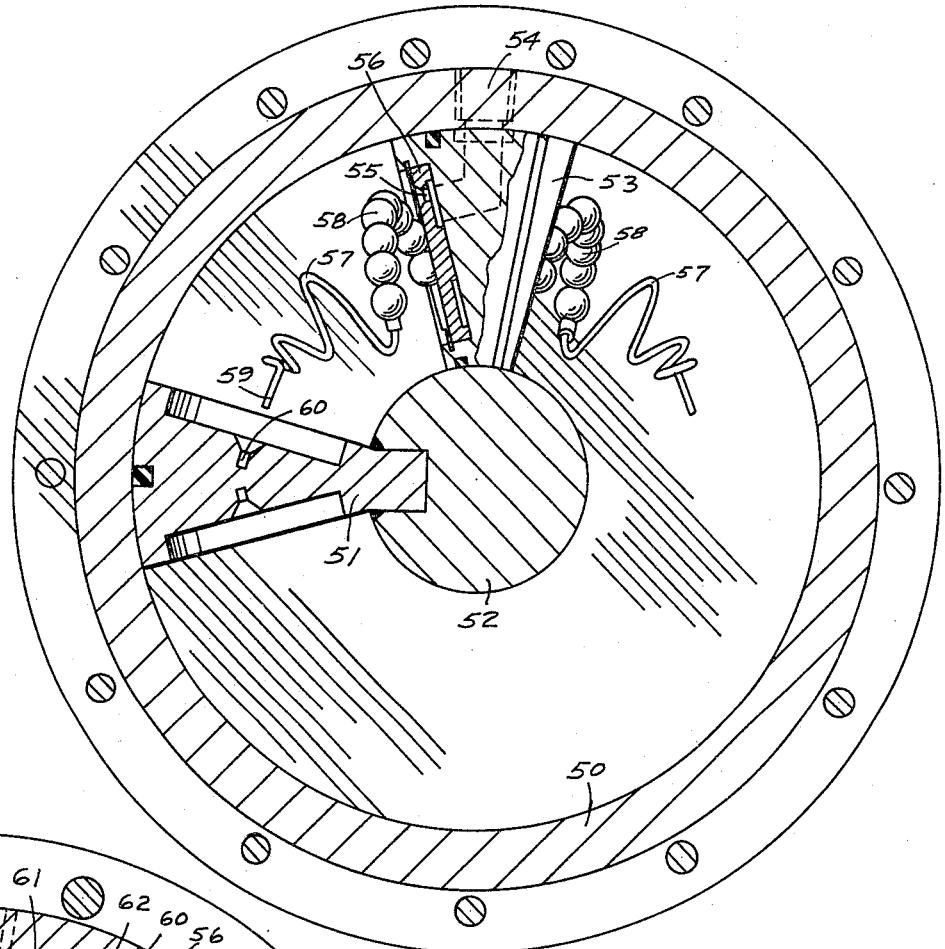
FIG. 17 is a transverse sectional view through a further modified form of fluid actuator.

Referring to FIGS. 1–5, a fluid actuator embodying the invention comprises a cylinder 10 which includes a cylindrical tube 11, and blind end cover 12 and rod end cover 13 secured to define the cylinder. A piston 14 having piston seals 15 is fixed on a piston rod 16 that extends through the rod end cover 13. The rod 16 operates through a piston rod bearing 17 and piston rod seal 18 which is retained in position by a piston rod seal retainer 19.

Ports 20 are provided in each end cover 12, 13 and extend to a metering passage 21 through a rotary metering valve 22. A carrier 24 which is in the form of a substantially spiral spring is secured to each end cover at its enlarged end by a set screw 23 that engages the axially bent end of the carrier. A closure member 26 in the form of a ball is secured on a portion of the carrier 24 by collars 25 and is adapted upon flexing of the carrier to engage a conical seat 30 that communicates with the port 20. The size of the opening 29 in the ball 26 is such that the ball is freely rotatable on the carrier 24.

As shown in FIG. 1, the end of the carrier adjacent the piston 14 is provided with a plurality of closely wound convolutions of smaller diameter 24a which are adapted to be engaged by the piston as it is moved toward one end or the other of the cylinder. As the piston engages the carrier 24, it progressively compresses the carrier causing it to flex and progressively move the closure member 26 toward the seat 30. When the closure 26 engages the seat 30, further flow of fluid out of the cylinder can only occur through the metering passage 21 so that the movement of the piston is controlled at a predetermined rate determined by the size of the passage. The movement of the carrier 24 upon further movement of the piston is limited by set screws 27 that engage portions of the carrier (FIG. 2).

In the form of the invention shown in FIG. 6, a plurality of closure members 26' in the form of balls are provided on the carrier 24' and are adapted to engage valve seats 30' to provide a cushioning of the piston as it approaches the end of the cylinder. This permits increased volume flow through the valve openings when the balls are not sealed.

In the form of the invention shown in FIGS. 7 and 8, in addition a closure member 40 in the form of a ball is provided on the carrier 24' and is adapted to engage a seat 32', after the closure members 26' have engaged the seats 30'. The closure member 40 engages the seat 32 cutting off flow through the metering passage and therefore serving as a positive stop after cushioning for the piston since no further fluid may flow out of the cylinder.

In the form of the invention shown in FIG. 9, the closure members 26" are provided in spaced relation on the carrier 24" by tubular spacers 41. The closure members 26" are adapted to progressively engage seats 30" and thereby provide progressive control of the movement of the piston toward the end of the cylinder. As shown in FIG. 10, rotary valves 42 are provided in association with each seat 30" to control the passage of fluid therethrough to the exterior of the cylinder.

In the form of the invention shown in FIGS. 11, 12 and 12a, each carrier 43 includes a central portion 43a comprising coils of constant diameter forming a uniform rate of deflection, and end portions 43b, 43c comprising coils with the necessary pitch and of progressively increasing diameter to providing the desired variable rate of deflection. As shown in FIG. 12a, one end 43d of the carrier extends inwardly and is connected to the end of the cylinder while the other end is connected to a guide 44 that maintains the carrier centrally located about the piston shaft and in addition forms a contact member for engaging the piston as the piston moves upwardly. The closure members comprise a plurality of balls mounted on the carrier and adapted to successively engage seats of openings in the cylinder as in the form of the invention shown in FIGS. 9 and 10. It can be seen that the openings communicate in a common annular chamber in the head of the cylinder.

By this arrangement, a harmonic de-accelerating motion is achieved over a large stroke of the piston. For example, by providing two variable rate portions 43b, 43c on the carrier and a central uniform rate portion 43a, the ratio of linear motion between piston and valve closures may be approximately 4 to 1.

In the form of the invention shown in FIGS. 13 and 14, a separate member 45 is provided at each end of the cylinder in which the valve seats 46 are provided, the latter being adapted to register with corresponding closure members which are not shown. Also in this form of the invention, the carrier 47 is fixed at its end by having an end 48 interengaged with a groove in the member 45 between member 45 and the cylindrical wall.

In the form of the invention shown in FIGS. 15 and 16, the carrier 49 supports a plurality of balls 50 that serve as closure members, the balls being of varying diameter and adapted to engage corresponding valve seats 51. The size of the openings 52 associated with the valve seats determines the rate at which the piston is de-accelerated. In this form of the invention, the piston includes an integral mechanical stop 53 that is adapted to engage the end of the cylinder.

In the form of the invention shown in FIG. 17, the fluid actuator comprises a rotary cylinder 50 in which a piston 51 fixed to a piston rod 52 rotates between extreme positions. The cylinder includes a radial wall 53 having outlets 54 therein, the flow of fluid to which is controlled through openings 55 in a disc 56. As in the previous forms of the invention, a carrier 57 supports a plurality of closure members 58 that are adapted to be successively brought into engagement with the seats surrounding the openings 55. The movement of the carrier is achieved by having an end 59 engaging an opening 60 in the piston to flex or compress the carrier and in turn move the closure members 58 successively into engagement with the openings 55.

Figure 18:
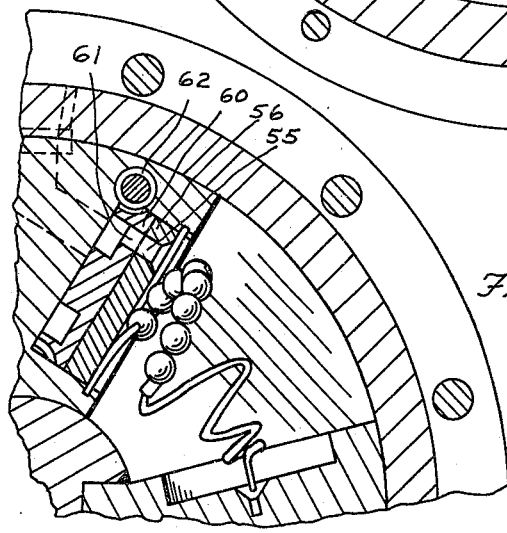
FIG. 18 is a fragmentary transverse sectional view through a further modified form of fluid actuator.

In the form of the invention shown in FIG. 18, the rotary fluid actuator includes a secondary disc 60, beneath the disc 56, which has openings 61 therein that can be moved into varying degrees of registry with the openings 55 and thereby further control the flow of the fluid through the openings 55. The periphery of the disc 60 is provided with teeth engaged by screw 62 which upon rotation will rotate the disc 60.

Figure 19:
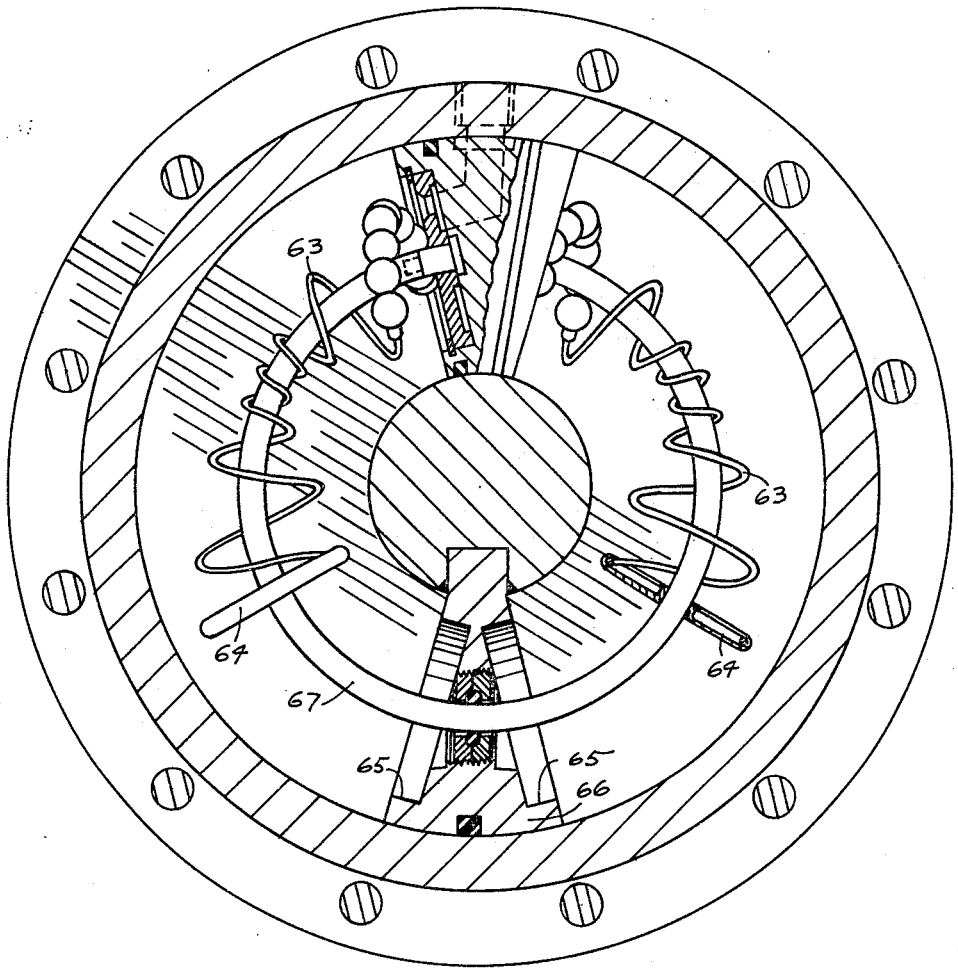
FIG. 19 is a transverse sectional view through a further modified form of fluid actuator.
Figure 27:
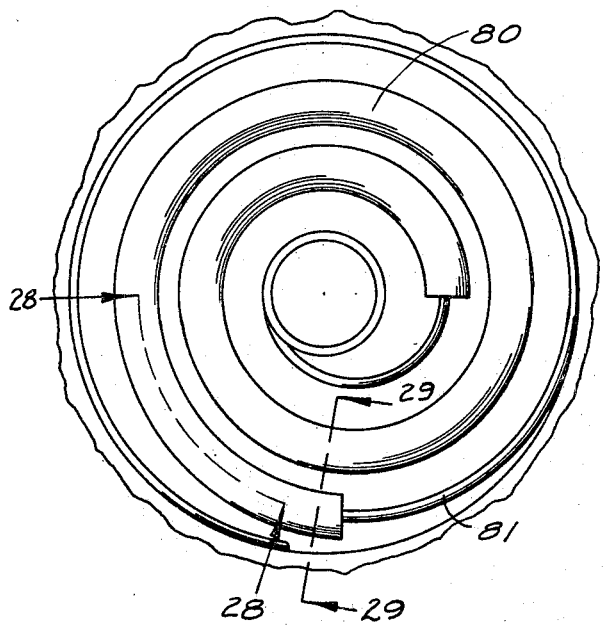
FIG. 27 is a fragmentary plan view of a further modified form of closure member.
Figure 29A:
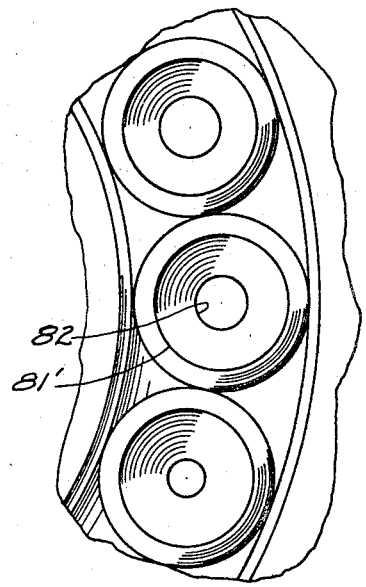
FIG. 29a is a fragmentary plan view of a portion of the actuator shown in FIGS. 27–29.
Figure 28:
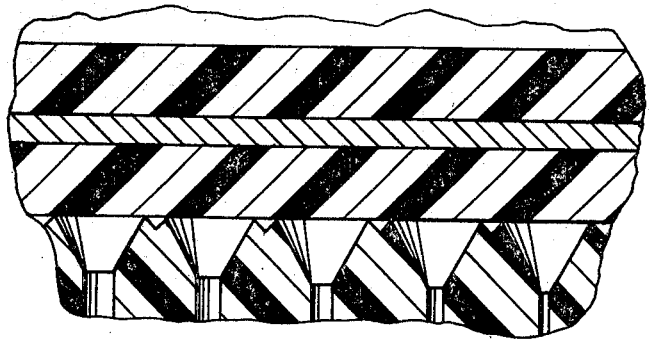
FIG. 28 is a fragmentary sectional view on an enlarged scale taken along the line 28—28 in FIG. 27.
Figure 29:
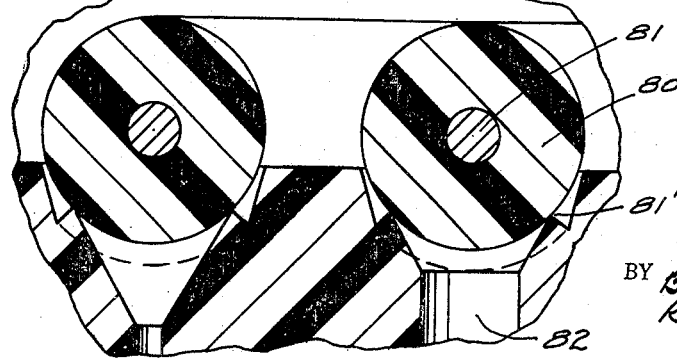
FIG. 29 is a fragmentary sectional view on an enlarged scale taken along the line 29—29 in FIG. 27.

In the form of the invention shown in FIG. 19, the rotary fluid actuator has carriers 63 that vary in their contour so that the central portion of the carrier has a lesser diameter than the end portions. The free end portion is provided with a carrier guide 64 which engages a pocket 65 in the piston 66. The type of carrier shown in FIG. 19 will provide a cushioning action through a greater angular movement of the piston. As shown, a carrier guide 67 is provided to maintain the carrier in generally central position of the space in which the carrier is positioned. The arrangement shown provides for the deceleration to occur in a stroke of approximately 90 degrees of angular movement, although the structure may be varied to obtain different strokes.

In accordance with the invention, the closure members heretofore shown have been in the form of balls but they may also take other forms. Thus, as shown in FIGS. 20-22, each of the closure members may comprise a generally frusto-conical member 70 through which the carrier 71 extends. The lower end of the member 70 is formed with a concave surface 72 defining a sealing edge 73 that surrounds the opening 74 that leads to the port of the cylinder. As shown in FIGS. 23, 24 a plurality of closure members 70 can be provided on a single carrier to achieve the same result as a plurality of balls in the previous forms of the invention.

In the form of closure members shown in FIGS. 25, 26, the closure members 75 are generally frusto-conical in shape and have concave surfaces 76 defining sealing edges 77. In this form, the members 75 are of progressively changing size from the end toward the middle along the carrier 78.

In the form of the invention shown in FIGS. 27-29a, the closure member 80 on the carrier 81 is in the form of a resilient body of cylindrical cross section which progressively engages annular sealing ribs 81 surrounding each outlet opening 82 that extends to the port of the cylinder.

In the form of the invention shown in FIGS. 30-33, closure member 85 is in the form of a resilient body of increasing cross section toward its center and decreasing cross section toward its ends and is mounted on the carrier 86. The openings 87 which extend to the ports of the cylinder are of increasing diameter toward the corresponding increasing size of the closure member and are separated by ribs 88 that are engaged by the closure 85 to provide a seal. The closure 85 also engages the sides 89 of a depression from which the openings 87 extend to complete the seal.

In the form of the invention shown in FIGS. 34-37, the fluid actuator comprises a shock absorber 90 which includes a double wall cylinder 91 in which a piston 92 and associated piston rod 93 are reciprocable. The extended end of the piston rod is formed with a coupling 94 while at the other end the cylinder is formed with a coupling 95. Carriers 96 are fixed to opposite sides of the piston and comprise a general configuration such as shown in FIGS. 11 and 12. One end of each carrier 96 extends radially inwardly as at 96a into a groove 92a of the piston and an opening 93a of the piston rod. A closure member 97 in the form of a resilient body that is generally crescent shaped and of progressively decreasing cross sectional area from the center to the ends is mounted on each carrier 96. The closure member 97 is formed with an elongated concave undersurface 98 defining spaced sealing edges 99. Each face of the piston 92 is formed with a compressible member 100 having a crescent shaped opening 101 extending circumferentially along an elevated annular surface 102 and a tapering wall 103 extending axially inwardly and tangent to a semicircular annular groove 104 in the inner face of member 100. The piston includes a restrictor member 92b in accordance with well known shock absorber construction, which restrictor meters the flow of fluid through the piston. As a force causes relative movement between the piston and cylinder, the carrier 96 is compressed to bring progressively portions of the closure member 97 into engagement with the elevated surface 102 and progressively close the opening 101, the area of which defines a cosine curve. The shape and material of which member 100 is formed is such that under high pressure the total area of the aperture formed is further reduced.

In the form of the invention shown in FIG. 38, the carrier 96′ is square in cross section as contrasted to circular as shown in FIG. 37.

In the form of the invention shown in FIGS. 39-41, the carrier 105 has its end fixed to a plate 106 that is formed with a plurality of openings 107 of varying cross section. The carrier 105 supports a closure member 108. The closure 108 comprises a metal strip 109 which is embedded in a resilient body 110 of rubber or the like. One end of the metal strip is bifurcated and passes between two stops on the carrier. The other end of the metal strip terminates in spaced relation to the end of body 110 and the carrier passes through the end of the body 110. As the piston moves toward the end of the cylinder, and the carrier is flexed or compressed, progressive portions of the closure member 108 are brought into engagement with successive openings 107 that lead to an outlet 111 thereby providing the varying restrictive or cushioning effect.

In the form of the invention shown in FIGS. 42-44, the carrier 112 is similarly fixed to the end of the cylinder and supports a closure member 113 that comprises a metal strip 114 which has one bifurcated end 115 engaging between collars 116 on the carrier and the other end with three spaced projections through which the carrier passes. Balls 117 on the metal strip are retained by struck out portions 118 that hold the balls in the openings 120 in the metal strip 114. As in the previous forms of the invention, as the piston is moved toward the end of the cylinder, the carrier is compressed bringing progressive balls into engagement with successive openings 121 that lead to an outlet 122 thereby providing the restrictive or cushioning effect.

Figure 45:
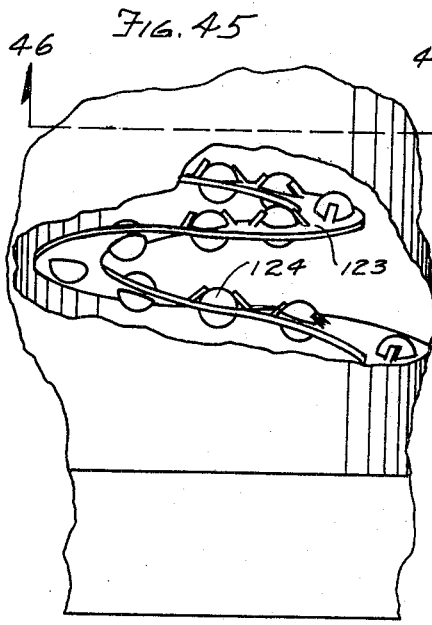
FIG. 45 is a fragmentary longitudinal sectional view of a further modified form of actuator.
Figure 46:
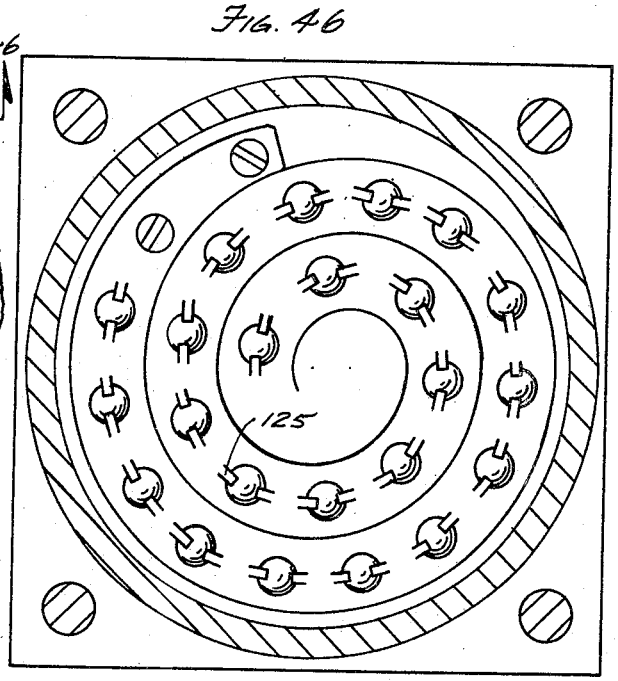
FIG. 46 is a sectional view taken along the line 46—46 in FIG. 45.

In the form of the invention shown in FIGS. 45 and 46, the carrier 123 is in the form of a spring metal spiral that is fixed at one end of the cylinder and supports a plurality of balls 124 which are retained by struck out portions 125 as in the previous form of the invention.

Figure 47:
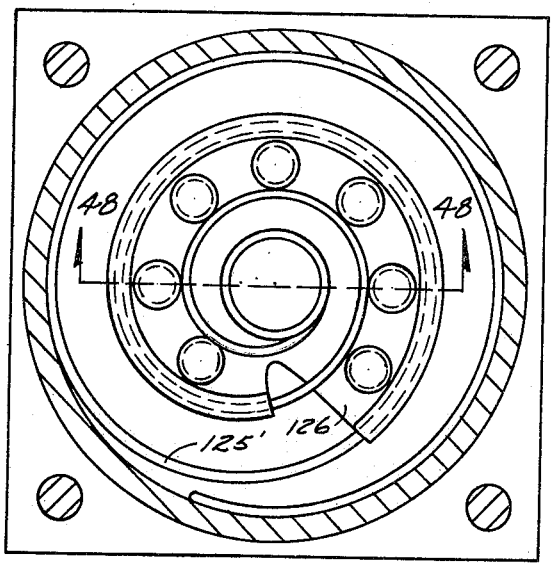
FIG. 47 is a transverse sectional view similar to FIG. 46 of a further modified form of actuator.
Figure 48:
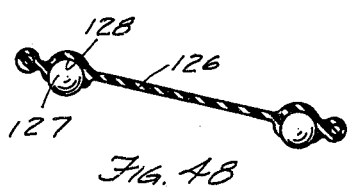
FIG. 48 is a sectional view taken along the line 48—48 in FIG. 47.

In the form of the invention shown in FIGS. 47 and 48, the carrier 125' is in the form of a spring wire that is generally spiral and helical rubber body 126 is stretched between adjacent convolutions and supports balls 127 in pockets 128 which balls are adapted to progressively engage seats in the end of the cylinder to provide the restrictive or cushioning effect as in the previous forms of the invention.

In the form of the invention shown in FIGS. 49 and 50, the openings in the end of the cylinder which are engaged by closure members are formed by two discs, namely, a stationary disc 130 that is non-rotatably fixed in the end of the cylinder by pins 131 and a rotatable disc 132. The discs 130, 132 have tapered openings 133, 134 which when in registry define a venturi opening. The disc 132 is formed with teeth 135 that are engaged by a pinion 136 to rotate the plate 132 and thereby change the registry of the openings and in turn the restrictive effect defined by the openings and, as can be seen in FIG. 49, this is inversely proportional to the opening sizes. As further shown in FIG. 50, disc 132 has an annular contact surface only, surrounding the upper end of each opening 134 that engages the underside of the disc 130 to provide a seal. In addition, an O-ring 138 around the disc 130 provides a seal with a cylinder wall.

In the form of the invention shown in FIGS 51 and 52, the seal between the discs 130', 132' is provided by an annular washer 139 and an underlying resilient annular washer 140 that overlie the openings 141 in the disc 132' in the end of the cylinder. Each of the washers 139, 140 has openings 142, 143 aligned with the openings 141 and is fastened by adhesive means so that when a gear 136' meshing with the disc 132' in which the openings 141 are positioned is rotated, the annular washers 139, 140 are also rotated to change the registry with the openings 133'. In this form, when a piston is moving toward the disc 132', the resilient washer 140 is compressed as shown in FIG. 52, not only providing for shock absorption and more adequate seal but also reducing the size of the opening 143 so that a further restriction to flow is achieved.

In the form of the invention shown in FIG. 53, the disc 130a has openings 133a with position pattern similar to the form shown in FIG. 49; but unlike it in that a proportioned variation of registry is obtained by openings 134a positioned in disc 132a on a displaced hole circle.

In the form of the invention shown in FIG. 54, a further modification of openings is provided including a difference of number of openings in each disc which results in a somewhat inverse proportionate variation in the registry of the openings which can receive closures with an adjustable variation in longitudinal position of the piston. Disc 132b has less openings 134b than openings 133b in disc 130b. By revolving disc 132b so that its openings become registered with a different set of openings in disc 130b and in turn flow through passages to engage different sets of closures moving longitudinally on the carrier.

In each of the forms of the invention wherein the disc carrying the openings that are contacted or closed by the closure member has openings of varying sizes that may be selectively brought into registry with one or more closure member, various means may be used for rotating the disc as heretofore disclosed. In addition, as shown in FIG. 55, the disc 145 which has openings 146 therein of varying size is mounted within the end 147 of the cylinder for rotation so that the openings 146 can selectively be brought into registry with outlet openings 147' that extend to a passage 148. A worm 149 is meshed with teeth 150 on the periphery of the disc so that on rotation of the worm, the desired registry of openings 146 and 147 is achieved and the angular position is adjusted.

In the form of the invention shown in FIG. 56, the ring member 151 comprises an annular member which has openings 152 of equal size and is rotatably mounted within the end of the cylinder 153. Each opening 152 has an "O" ring seal 152a that seals with the cylinder end. In this form as in the previous form, a worm 154 meshes with teeth 155 on the ring 151 to selectively rotate the disc and bring one of the openings 152 into alignment with the one or more outlet opening 156 that extends to a passage 157. As shown, an additional metering orifice 158 is provided through which flow is controlled by a rotatable metering valve 159.

In the form of the invention shown in FIGS. 57 and 58, the disc 160 has a projection 161 thereon which is engaged by the ends of threaded pins 162 to control the angular position of the disc 160. This form of the invention also shows a resilient intermediate member 163 that is fastened by adhesive to member 160 and facing plate 164 so that alignment of openings 165, 166, and 167 is maintained with rotating to vary registry with the openings 168 in the end member 169.

In the form of the invention shown in FIGS. 59-61, the invention is adapted to be utilized with cylinders of conventional construction that are modified by insertion of a cartridge 170 that is selectively positioned in the end of a cylinder between a spring rod adjustment screw 172 and a retaining ring 171. The cartridge has a pair of sealing rings 173 on the exterior surface of the casing 179 and the body member 107 thereof which are on opposite sides of an external passage in the end of the cylinder so that an annular fluid passage 174 is provided on the exterior of the cartridge. As shown in FIG. 59, within the cartridge there is provided a valve seat plate 175 that has a plurality of circumferentially spaced valve seats 175a and passages 175b therein. A spiral shaped carrier 177 has one end 176 thereof extending longitudinally of the casing into an opening 176 in the valve plate 175 between protrusions 178 of the cartridge casing 179. The cartridge further includes an adjustment plate 180 having a compressible member 181 fixed thereon and a facing plate 182 fixed on compressible member 181. The member 180 includes an axial projection 180a into one end of which helical rod 186 extends with an end 186a thereof engaging an opening 186b. The upper end of helical rod 186 is similarly non-rotatably interlocked with probing contact 184. The carrier 177 having closure members thereon as presently described has its upper end 183 rotatably threaded on the adjustment member 184. The adjustment spool 172 has teeth 172a thereon engaging teeth 172b on the projection 180a. By rotating the spool in small angular increments, the aligned openings in the members 180, 182 can be varied in registry with the openings in the valve plate 175. 360° rotation of the spool will provide longitudinal adjustment of contact member 184 while maintaining the registry of the openings in members 175, 182.

As shown in FIG. 61, the closure members 190 may comprise a plurality of balls which are rotatably mounted on the carrier 177 in spaced relation by resilient spacers 191. In the form of the invention shown in FIG. 62, the closure members comprise a continuous resilient member 192 having spaced spherical projections 193 which are threaded on the carrier 177'.

I claim:
1. In a fluid actuator, the combination comprising
  a cylinder,
  a piston,
  one of said cylinder and said piston having a plurality of openings therein for controlling fluid flow therethrough,
  a carrier fixed on said one of cylinder and said piston which has said openings therein,
  a plurality of closure members movably mounted on said carrier and operable upon movement relatively between said piston and said cylinder to move the carrier and, in turn, the closure members against said openings.

2. The combination set forth in claim 1 wherein said closure members comprise portions of an elongated generally cylindrical body of resilient material.

3. The combination set forth in claim 1 wherein said openings comprise a portion of the cylinder made of resilient material and having an annular shoulder surrounding said openings engaged by said closure members.

4. The combination set forth in claim 3 wherein said closure members comprise a portion of a spiral shaped body of resilient material having a progressively increasing diameter.

5. The combination set forth in claim 4 wherein said openings engaged by said body have differing diameters.

6. The combination set forth in claim 3 wherein said closure members comprise portions of an elongated generally helical body of resilient material, said body having a surface with spaced sealing edges adapted to overlie successive openings.

7. The combination set forth in claim 1 wherein said closure members comprise portions of an elongated body of resilient material.

8. The combination set forth in claim 1 wherein said closure members comprise portions of a flexible elongated body and a plurality of balls supported in said body.

9. The combination set forth in claim 1 wherein said closure members comprise portions of a body of resilient material supported by adjacent legs of a spiral carrier, said body having pockets therein, and a plurality of balls seated and frictionally held in said pockets.

10. The combination set forth in claim 1 including means associated with said openings for varying the size of the openings.

11. The combination set forth in claim 1 wherein said carrier and closure members form a unitary removable element in the wall of said cylinder.

12. The combination set forth in claim 1 wherein said openings are of different sizes.

13. The combination set forth in claim 1 including a disc member having openings aligned with the openings, said disc member being movable relative to said openings to change the restriction of the openings in said disc member with the first-mentioned openings.

14. The combination set forth in claim 1 wherein said carriers are fixed on said cylinder.

15. The combination set forth in claim 1 including means for varying the size of said openings.

16. The combination set forth in claim 1 wherein said carrier comprises an elongated flexible member.

17. The combination set forth in claim 16 wherein said closure members comprise balls.

18. The combination set forth in claim 17 wherein said balls are of differing diameters.

19. The combination set forth in claim 17 wherein said openings are of different sizes.

20. The combination set forth in claim 16 wherein said closure members comprise resilient blocks of resilient material.

21. The combination set forth in claim 16 wherein each said block has a concave surface adapted to overlie said opening.

References Cited

UNITED STATES PATENTS

| | | | |
|---|---|---|---|
| 845,827 | 3/1907 | Steedman | 91—407 |
| 2,246,461 | 6/1941 | Cannon | 91—26 |
| 2,783,742 | 3/1957 | Shafer | 91—407 |
| 2,786,452 | 3/1957 | Tucker | 91—407 |
| 1,920,146 | 7/1933 | Hueber et al. | 91—395 |
| 2,847,032 | 8/1958 | Fleming | 91—394 |
| 2,853,974 | 9/1958 | Hewitt | 91—394 |
| 2,987,047 | 6/1961 | Young | 91—395 |
| 3,331,289 | 7/1967 | Vander Horst | 91—395 |

FOREIGN PATENTS 605,343  10/1962  Canada.

PAUL E. MASLOUSKY, Primary Examiner

U.S. Cl. X.R.

91—407, 422; 137—628; 188—88